No. 818,890. PATENTED APR. 24, 1906.
A. JEŽEK.
COTTON CHOPPER.
APPLICATION FILED NOV. 21, 1905.

2 SHEETS—SHEET 1.

Witnesses
Louis R. Heinrichs
Herbert D. Lawson

Inventor
Anton Ježek

By W. J. FitzGerald & Co.
Attorneys

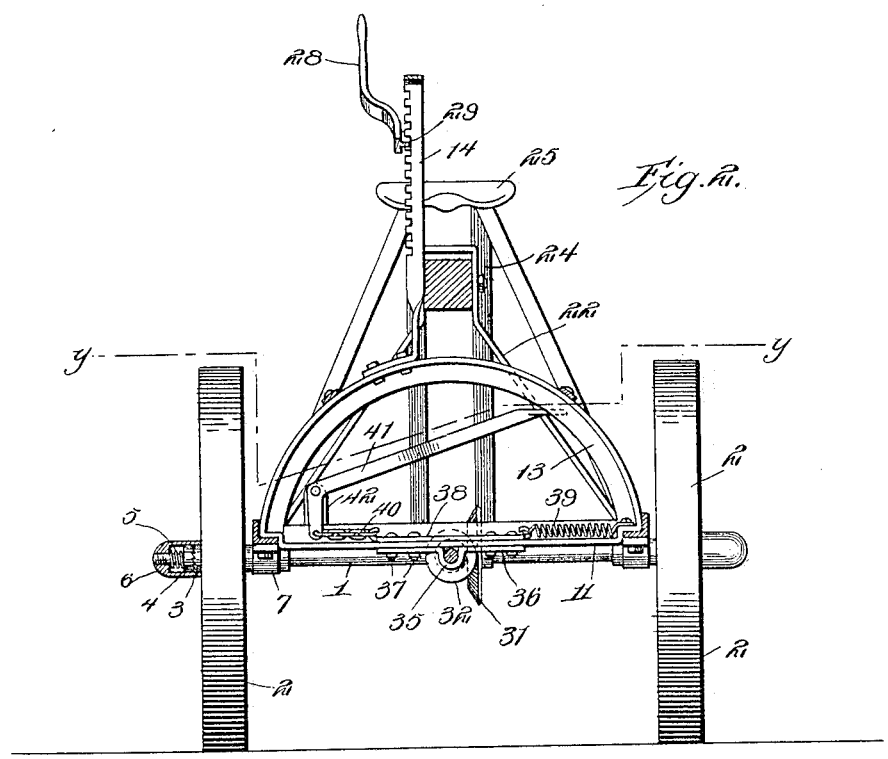

UNITED STATES PATENT OFFICE.

ANTON JEŽEK, OF PRAHA, TEXAS.

COTTON-CHOPPER.

No. 818,890.  Specification of Letters Patent.  Patented April 24, 1906.

Application filed November 21, 1905. Serial No. 288,379.

*To all whom it may concern:*

Be it known that I, ANTON JEŽEK, a citizen of the United States, residing at Praha, in the county of Fayette and State of Texas, have invented certain new and useful Improvements in Cotton-Choppers; and I do hereby declare the following to be a full, clear, and exact description of the invention, such as will enable others skilled in the art to which it appertains to make and use the same.

My invention relates to cotton-choppers; and its object is to provide a simple, light, and durable device of this character which can be readily controlled by the operator so as to move the hoes into or out of operative position and to adjust the machine from or toward the ground so as to accommodate it to any uneven surfaces.

The invention consists of a frame pivotally mounted on a supporting-axle, and a draft-beam is disposed above and is pivoted to this frame and is slidably mounted within a yoke extending upward from the frame. Manually-operated means are connected to the yoke and beam, whereby the frame can be readily tilted upward or pressed downward according to the will of the operator. A shaft is mounted on the frame and is adapted to be driven by the axle, and connected to the shaft are spring-controlled hoes adapted to be brought successively into contact with the ground and capable of a flipping motion whereby the material gathered thereby will be automatically thrown to one side. Novel means are employed for throwing the shaft into or out of operative relation to the axle.

The invention also consists of the further novel features of construction and combination of parts, the preferred form whereof will be hereinafter clearly set forth, and pointed out in the claims.

In the accompanying drawings I have shown the preferred form of my invention.

Figure 1:
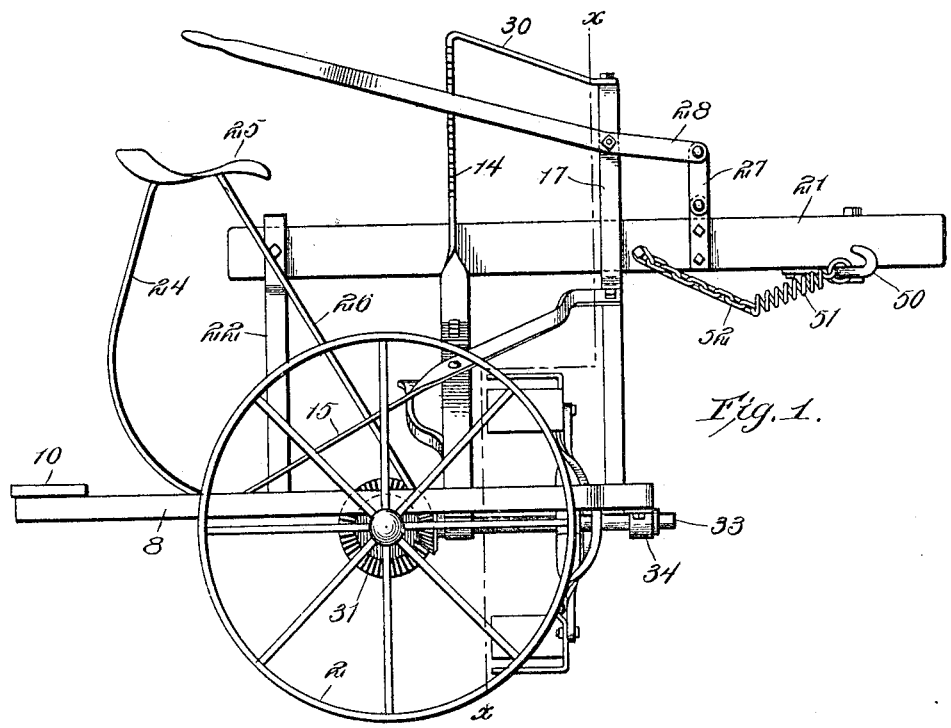
Figure 4:
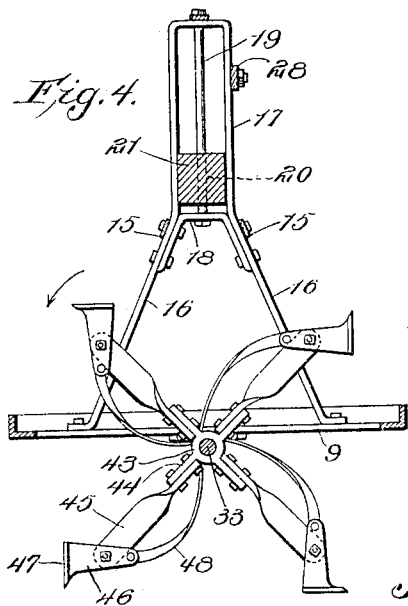
Figure 5:
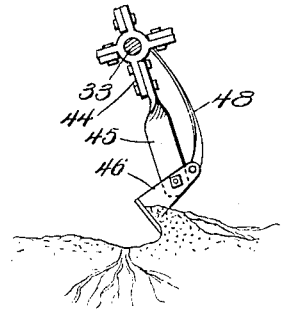

In said drawings, Figure 1 is a side elevation of the machine. Fig. 2 is a section on line $xx$, Fig. 1, looking toward the rear of the machine. Fig. 3 is a section on line $yy$, Fig. 2. Fig. 4 is a section on line $xx$, Fig. 1, looking toward the front of the machine. Fig. 5 is a detail view showing one of the hoes in the position assumed by it during the cutting operation and just prior to the operation of flipping gathered material to one side of the machine, and Fig. 6 is a detail view of a portion of the intermediate cross-bar of the frame.

Referring to the figures by numerals of reference, 1 is an axle mounted in wheels 2, each of said wheels having a clutch member 3 extending from its hub and normally engaged by a clutch member 4, which is spring-pressed, as shown at 5, both members being inclosed by a cap 6. By this arrangement of parts the shaft is caused to rotate when the machine is moving forward; but when either or both of the wheels rotate in the opposite direction the axle will be unaffected thereby. Bearings 7 are mounted on the axle and depend from the sides 8 of a frame, said frame having an angular front bar 9 and a rear cross-strip 10 connecting its sides, said front bar and the sides being preferably formed in a single length of angle-iron.

A cross-bar 11 connects the sides of the frame at a point in front of the axle, and this cross-bar has a series of slots 12 therein, while its ends are formed integral with the substantially semicircular arch 13, which constitutes a support for a rack 14, extending upward from the arch. Secured to this arch are side braces 15, fastened at their lower ends to the sides 8 and extending across the arch and secured at their forward ends to standards 16, which converge upwardly and are mounted upon the front bar 9 of the frame. These standards are formed integral with an elongated rectangular yoke 17, the lower end of the yoke being closed by a strip 18, which is bolted or otherwise secured to the standards 16 and is connected at its center to the upper end of the yoke by means of a guide-rod 19. This rod extends loosely through an aperture 20, formed within a draft-beam 21, and the rear end of said beam is pivoted between two integral converging standards 22, mounted on the sides 8 of the frame in rear of axle 1. A cross-strip 23 connects the sides 8 in rear of standards 22, and mounted on this strip are springs 24, which support a driver's seat 25, said seat being mounted at its forward portion upon rearwardly-inclined converging supports 26, which are secured to the sides 8 close to the cross-bar 11. A link 27 is pivotally connected to the draft-beam 21 in front of yoke 17, and this link is also pivoted to the forward end of an operating-lever 28, which is fulcrumed between its ends to one side of yoke 17 and has a longitudinally-extending rib 29 upon one face adapted to be placed in engagement with any one of the teeth of rack 14. This rack has a forwardly-extending portion 30, which is secured to the top of the yoke, so that the yoke and rack will be rigidly connected at all times.

A bevel-gear 31 is secured to and rotates with the axle 1 and is adapted to mesh with a gear 32 at one end of a longitudinally-extending shaft 33. This shaft is loosely mounted adjacent its forward end in a bearing 34, while that end nearest gear 32 is rotatably mounted within a bearing-plate 35, having laterally-extending ears 36, from which extend bolts 37, which project through the slots 12 in cross-bar 11 and engage a slide 38, mounted on said bar.

One end of slide 38 is connected, by means of a coiled spring 39, with one end of the cross-bar 11, and the other end of the slide is connected, by means of a chain 40 or other flexible device, with one arm of a bell-crank lever 41, fulcrumed upon a standard 42, extending upward from the bar 11. This bell-crank lever is in the form of a treadle which extends in front of and below the seat 25, where the same can be readily depressed by the foot of the operator. Secured to shaft 33 in rear of the front bar 9 is a sleeve 43, from which radiate, preferably, four ears 44. Each of these ears has an arm 45 detachably secured to it, and pivoted to the outer end of each arm is a side strip 46, extending upward from one side of a hoe 47. Intersecting bow-springs 48 are riveted or otherwise secured at their centers to the sleeve 43, and the ends of these springs are pivoted to the side strips 46.

Any suitable draft appliances may be connected to the machine; but I preferably use rods 50, which are pivoted at one end to the draft-beam, while their other ends are hooked and connected to said beam by coiled springs 51 and chains 52. These hooked rods are adapted to be placed in engagement with swingletrees, (not shown,) and springs 51 serve to assist in starting the forward movement of the machine.

When the machine herein described is drawn forward, the rotating axle 1 will revolve gear 31, and this in turn will transmit motion to the shaft 33 through gear 32. The hoes 47 will therefore be revolved in the direction of the arrow shown in Fig. 4 and will be brought successively into contact with the surface of the ground. The resistance offered by the ground will press the hoes backward as they cut into the surface and springs 48 will therefore be elongated and tensioned. As soon as the hoes have passed from under the shaft 33 and the resistance thereto removed springs 48 will quickly reassume their original positions and swing the side strips 46 back, so that the hoes 47 will be flipped forward into their original positions with sufficient momentum to throw the material accumulated thereby to one side of the machine.

Should the operator desire to raise the hoes during their operation, so that they can pass over rough places or to avoid large stones, stumps, &c., he pulls upward on the lever 28, and as beam 21 is supported at its forward end by the draft-animals and is pivoted at its rear end to standards 22 it will be obvious that the yoke 17 will be drawn upward with the lever and can be locked in such position by placing the lever in engagement with the rack 14. The forward end of the frame of the machine will therefore be directed upward. By reversing this operation the front end of the frame can be swung downward, so as to bring the hoes nearer to the ground.

Should it be desired to disconnect the shaft 33 from gear 31, the operator depresses the treadle 41 and causes the same to pull the slide 38 laterally, so as to tension spring 39 and draw the bearing 35 and shaft 33 to one side, so as to remove the gear 32 from mesh with gear 31. As soon as the treadle is released the spring 39 will of course return the parts to their normal positions.

Having thus fully described my invention, what I claim as new, and desire to secure by Letters Patent, is—

1. In a cotton-chopper, the combination with a movable frame; of a rotatable transversely-movable hoe mounted upon the frame, means operated by the movement of the frame for actuating the hoe, and means for automatically flipping the hoe in the direction of its movement immediately subsequent to its engagement with the ground.

2. In a cotton-chopper, the combination with a movable frame; of a series of rotatable transversely-movable hoes mounted within the frame, mechanism operated by the movement of the frame for rotating the hoes, and springs adapted to be tensioned by the contact of the hoes with the ground and to flip said hoes in the direction of their movement when released from the ground.

3. In a cotton-chopper, the combination with a movable frame; of a longitudinally-extending shaft rotatably mounted on the frame, means operated by the movement of the frame for rotating the shaft, arms radiating from the shaft, hoes pivoted thereto, and springs connected to the hoes and adapted to flip them laterally in the direction of their movement subsequent to their chopping operation.

4. In a cotton-chopper, the combination with a rotatable arm; of a hoe pivotally connected thereto and a spring adapted to be tensioned when the hoe contacts with the surface of the ground and to flip the hoe when disengaged from the ground.

5. In a cotton-chopper, the combination with a rotatable arm; of a hoe, a side strip extending therefrom and pivoted between its ends to the arm, and a spring connecting the free end of the side strip to the arm for holding said arm normally in, and for automatically returning it to, a predetermined position.

6. In a cotton-chopper the combination with a movable frame pivotally supported between its ends, and actuating mechanism within the frame; of a longitudinally-extending rotatable shaft adapted to be operated by said mechanism said shaft extending to one end of the frame, a series of hoes connected to the shaft and rotatable therewith, a draft-beam pivotally supported upon and connected to the frame, a yoke extending from the forward end of the frame and slidably connected to the draft-beam, a rack rigidly secured to and extending from the frame, said rack and yoke being secured together, an adjusting-lever fulcrumed on the yoke and movably connected to the draft-beam, said lever adapted to engage the rack.

7. In a cotton-chopper the combination with traction-wheels and an axle rotatable therewith, of a frame pivotally mounted adjacent its center upon the axle, a draft-beam pivotally supported above and connected to the frame in rear of the axle, a yoke rigidly secured to the forward portion of the frame, said draft-beam being slidably mounted within the yoke, a rack rigidly connected to the frame, and secured to the yoke and a lever fulcrumed upon the yoke and movably connected to the draft-beam, said lever adapted to engage and be locked by the rack, and a series of rotatable hoes mounted in the forward end of the frame.

In testimony whereof I have signed my name to this specification in the presence of two subscribing witnesses.

ANTON JEŽEK.

Witnesses:
L. P. NITARDUS,
JOZEF MENSIK.